United States Patent
Nakatsuji et al.

(10) Patent No.: US 7,666,375 B2
(45) Date of Patent: Feb. 23, 2010

(54) METHOD FOR CATALYTIC REDUCTION OF NITROGEN OXIDES

(75) Inventors: Tadao Nakatsuji, Kashiba (JP); Norio Suzuki, Wako (JP); Hiroshi Ohno, Wako (JP); Naohiro Sato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 348 days.

(21) Appl. No.: 11/658,729

(22) PCT Filed: Aug. 1, 2005

(86) PCT No.: PCT/JP2005/014483

§ 371 (c)(1),
(2), (4) Date: Jan. 29, 2007

(87) PCT Pub. No.: WO2006/013998

PCT Pub. Date: Feb. 9, 2006

(65) Prior Publication Data

US 2009/0000281 A1     Jan. 1, 2009

(30) Foreign Application Priority Data

Aug. 2, 2004   (JP)   ............... 2004-225509

(51) Int. Cl.
  *B01D 53/56*   (2006.01)
  *B01D 53/94*   (2006.01)

(52) U.S. Cl. ............... 423/213.2; 423/213.5; 423/239.1; 60/274; 60/282; 60/299; 60/301

(58) Field of Classification Search ............. 423/213.2, 423/213.5, 239.1; 60/274, 282, 299, 301
See application file for complete search history.

(56) References Cited

U.S. PATENT DOCUMENTS

| | | | | |
|---|---|---|---|---|
| 5,008,090 A | * | 4/1991 | Joy et al. | 423/212 |
| 2004/0043897 A1 | * | 3/2004 | Tadao | 502/302 |
| 2007/0274889 A1 | * | 11/2007 | Nakatsuji et al. | 423/213.2 |
| 2008/0219906 A1 | * | 9/2008 | Chen et al. | 423/213.5 |
| 2009/0041644 A1 | * | 2/2009 | Wassermann | 423/213.5 |

FOREIGN PATENT DOCUMENTS

| | | | | |
|---|---|---|---|---|
| JP | 2003-305342 A | * | 10/2003 | |
| JP | 2004-092607 A | * | 3/2004 | |
| JP | 2004-209386 A | * | 7/2004 | |

* cited by examiner

*Primary Examiner*—Timothy C Vanoy
(74) *Attorney, Agent, or Firm*—Wenderoth, Lind & Ponack, L.L.P.

(57) ABSTRACT

A method comprising subjecting fuel to combustion while the combustion atmosphere of the fuel is oscillated periodically and alternately between rich and lean conditions, leading the exhaust gas formed to a catalytic reactor, and bringing the exhaust gas into contact with a catalyst in the catalytic reactor to conduct catalytic reduction of nitrogen oxides contained in the exhaust gas, wherein the catalyst comprises as catalyst components:

(A) an oxide catalyst component A comprising
  (a) ceria or
  (b) praseodymium oxide or
  (c) a mixture of oxides and/or a composite oxide of at least two elements selected from cerium, zirconium, praseodymium, neodymium, terbium, samarium, gadolinium and lanthanum; and
(B) (d) a noble metal catalyst component B selected from platinum, rhodium, palladium and oxides thereof;

under an oxygen concentration adjusted to the range of 0.1-1.0% at the exit of the catalytic reactor under the rich conditions.

8 Claims, 1 Drawing Sheet

METHOD FOR CATALYTIC REDUCTION OF NITROGEN OXIDES

TECHNICAL FIELD

The invention relates to a method for catalytic reduction of nitrogen oxides (which mainly comprise NO and $NO_2$, and will be referred to as NOx hereunder). More particularly, the invention relates to a method for reduction of NOx contained in exhaust gas wherein fuel is supplied to a combustion chamber of a diesel engine or a gasoline engine and subjected to combustion while the combustion atmosphere of fuel is oscillated between rich conditions and lean conditions periodically and alternately, and the resulting exhaust gas is introduced into a catalytic reactor and brought into contact with a catalyst contained in the catalytic reactor. This method is suitable for reducing and removing harmful nitrogen oxides contained in exhaust gas, e.g., from engines of automobiles.

In particular, the invention relates to a method for catalytic reduction of NOx contained in exhaust gas with no deterioration of catalyst even in the presence of sulfur oxides (which mainly comprise $SO_2$ and $SO_3$, and will be referred to SOx hereunder) wherein fuel is supplied and subjected to combustion while the combustion atmosphere of fuel is oscillated between rich conditions and lean conditions periodically, whereby NOx is generated in the exhaust gas.

In the invention, by the term "lean" is meant an air fuel ratio larger than the stoichiometric air fuel ratio for the fuel in question, while by the term "rich" is meant an air fuel ratio smaller than the stoichiometric air fuel ratio for the fuel in question. For normal automobile gasoline, the stoichiometric air fuel ratio is approximately 14.5. Further, the term "catalyst" includes a catalyst itself as well as a catalyst structure which contains the catalyst and works to remove NOx generated by combustion of fuel.

Accordingly, by the term "subjecting fuel to combustion while the combustion atmosphere of the fuel is oscillated between rich conditions and lean conditions periodically and alternately" is especially meant that fuel is supplied, injected or to a combustion chamber of a diesel engine or a gasoline engine, and is subjected to combustion mainly under the lean conditions wherein an air fuel ratio is high (as the oxygen concentration in exhaust gas after combustion of fuel is typically in a range of approximately 5% to 10%) while air fuel ratio is so adjusted that the combustion atmosphere of fuel is periodically and alternately oscillated between the rich conditions and the lean conditions.

The lean conditions wherein an air fuel ratio is high are formed usually by injecting fuel into a combustion chamber of an engine at an air fuel ratio in the range of 20-40. Accordingly, "high air fuel ratio" has a value in the range of 20-40. On the other hand, the rich conditions are formed usually by injecting fuel into a combustion chamber of an engine at an air fuel ratio in the range of 13-14.5 when gasoline is used as fuel, although depending upon oxidation ability of catalyst and the kind and concentration of reducing agent formed under the rich conditions. Accordingly, preferred rich conditions are such that the air fuel ratio has a value in the range of 13-14.5

BACKGROUND ART

NOx contained in exhaust gas has conventionally been removed by, for example, a method in which NOx is oxidized and then absorbed in alkaline solution or a method in which NOx is reduced to nitrogen by using a reducing agent such as ammonia, hydrogen, carbon monoxide or hydrocarbons. However, these conventional methods have their own disadvantages.

That is, the former method requires a means for handling the resulting alkaline waste liquid to prevent environmental pollution. The latter method, for example, when it uses ammonia as a reducing agent, involves a problem that ammonia reacts with SOx in exhaust gas to form salts, resulting in deterioration in catalytic activity at low temperatures. Accordingly, when NOx from moving sources such as automobiles is to be treated, the safety is a question.

On the other hand, when hydrogen, carbon monoxide or hydrocarbons is used as a reducing agent, the reducing agent reacts preferentially with oxygen since exhaust gas contains oxygen in a higher concentration than NOx. This means that substantial reduction of NOx needs a large quantity of a reducing agent, and hence resulting in remarkable fall of fuel efficiency.

It has been therefore proposed to catalytically decompose NOx in the absence of a reducing agent. However, the catalysts that have been conventionally known for direct decomposition of NOx have not yet been put to practical use due to their low decomposition activity for NOx. On the other hand, a variety of zeolites have been proposed as a catalyst for catalytic reduction of NOx using a hydrocarbon or an oxygen-containing organic compound as a reducing agent. In particular, Cu-ion exchanged ZSM-5 or H type (hydrogen type or acid type) zeolite ZSM-5 ($SiO_2/Al_2O_3$ molar ratio=30 to 40) has been regarded as optimal. However, it has been found that even the H type zeolite has no sufficient reduction activity, and particularly the zeolite catalyst is rapidly deactivated on account of dealumination of the zeolite structure when water is contained in exhaust gas.

Under these circumstances, it has been necessary to develop a more active catalyst for the catalytic reduction of NOx. Accordingly, a catalyst composed of an inorganic oxide carrier material having silver or silver oxide supported thereon has recently been proposed, as described in EP-A1-526099 or EP-A1-679427. However, it has been found that the catalyst has a high activity for oxidation, but a low activity for selective reduction of NOx, so that the catalyst has a low conversion rate of nitrogen oxides to nitrogen. In addition, the catalyst involves a problem that it is deactivated rapidly in the presence of sulfur oxides. The catalyst catalyzes the selective reduction of NOx with hydrocarbons under full lean conditions, but it has a lower NOx conversion and a more narrow temperature window (temperature range) than the known three way catalyst. This makes it difficult for such lean NOx catalysts to be practically used. Thus, there has been a demand for developing a more heat-resistant and more active catalyst for catalytic reduction of nitrogen oxides.

In order to overcome the above-mentioned problems, a NOx storage-reduction system has recently been proposed as one of the most promising methods, as described in WO 93/7363 or WO 93/8383. In the proposed system, fuel is periodically spiked for a short moment to a combustion chamber in excess of the stoichiometric amount under rich conditions. Vehicles with lean burn engines can be driven at lower fuel consumption rates than conventional vehicles. It is because such vehicles can be driven at a much lower fuel/air ratio than the conventional vehicles. This NOx storage-reduction system for lean burn engines reduces NOx in two periodic steps at intervals of one to two minutes.

That is, in the first step, NO is oxidized to $NO_2$ on platinum or rhodium catalyst under normal lean conditions, and the $NO_2$ is absorbed as a nitrate such as potassium nitrate in an absorbent such an alkali compound as potassium carbonate or barium carbonate. Subsequently, rich conditions are formed for the second step, and are maintained for several seconds. Under the rich conditions, the absorbed (or stored) $NO_2$ is released from the absorbent and is efficiently reduced to nitrogen with hydrocarbons, carbon monoxide or hydrogen on the platinum or rhodium catalyst. This NOx storage-reduction system works well over a long period of time in the absence of SOx. However, there is a problem that in the presence of SOx, the catalytic system deteriorates drastically due to the irreversible absorption of SOx at $NO_2$ absorption sites on the alkali compound under either the lean or the rich conditions. In addition, since NOx is absorbed as a nitrate in the method, it is necessary that the rich conditions are strengthened to decompose and reduce the nitrate under the rich conditions, and consequently the method has a problem that fuel efficiency is deteriorated.

Accordingly, for the purpose of remedying the weak point or solving the problem in that the NOx storage-reduction system deteriorates in performance in the presence of SOx, there has been recently proposed in WO 02/8997 such a catalyst that has a purification ability close to the NOx storage-reduction system and a high SOx durability. The catalyst comprises:

(A) an outer catalyst layer comprising an outer catalyst component, wherein the outer catalyst component comprises
  (a) ceria or;
  (b) praseodymium oxide or;
  (c) at least one selected from the group consisting of a mixture of oxides of at least two elements and a composite oxide of at least two elements, the elements being selected from the group consisting of cerium, zirconium, praseodymium, neodymium, gadolinium and lanthanum; and
(B) an inner catalyst layer comprising an inner catalyst component, wherein the inner catalyst component comprises
  (d) at least one selected from the group consisting of platinum, rhodium, palladium and oxides thereof; and
  (e) a carrier.

Further, there has been proposed in WO 02/22255 a catalyst that has a high SOx durability, which comprises an outer catalyst layer comprising a first catalyst component selected from rhodium, palladium and oxides thereof and a second catalyst component selected from zirconia, cerium oxide, praseodymium oxide, neodymium oxide and mixtures thereof, and an inner catalyst layer comprising a third catalyst component selected from rhodium, palladium, platinum and oxides thereof.

DISCLOSURE OF THE INVENTION

It is an object of the invention to provide a method which comprises subjecting fuel to combustion mainly under lean conditions while the combustion atmosphere of fuel is oscillated periodically and alternately between rich and lean conditions, leading the exhaust gas formed to a catalytic reactor, and bringing the exhaust gas into contact with a catalyst in the catalytic reactor to conduct catalytic reduction of nitrogen oxides contained in the exhaust gas with high durability and high fuel efficiency even in the presence of oxygen, sulfur oxides and water in a wide range of reaction temperature In particular, it is an object of the invention to provide a highly efficient method for reduction of nitrogen oxides in a wide temperature range even in the presence of oxygen, sulfur oxides or water, especially even in the presence of sulfur oxides which brings about serious problem to the NOx storage catalyst, without generation of harmful ammonia under rich conditions, and with no reaction of absorbed NOx with a reducing agent to release NOx under rich conditions to gas phase, in which method fuel is subjected to combustion while the atmosphere of combustion of the fuel is oscillated between lean conditions where an air fuel ratio is high and rich conditions.

The invention provides a method which comprises subjecting fuel to combustion while the combustion atmosphere of fuel is oscillated periodically and alternately between rich and lean conditions, leading the exhaust gas formed to a catalytic reactor, and bringing the exhaust gas into contact with a catalyst in the catalytic reactor to conduct catalytic reduction of nitrogen oxides contained in the exhaust gas, wherein the catalyst comprises as catalyst components:

(A) an oxide catalyst component A comprising
  (a) ceria or
  (b) praseodymium oxide or
  (c) a mixture of oxides and/or a composite oxide of at least two elements selected from the group consisting of cerium, zirconium, praseodymium, neodymium, terbium, samarium, gadolinium and lanthanum; and
(B) (d) a noble metal catalyst component B selected from the group consisting of platinum, rhodium, palladium and oxides thereof;

under an oxygen concentration adjusted in the range of 0.1-1.0% at the exit of the catalytic reactor under the rich conditions.

According to the method of the invention, it is preferred that the noble metal catalyst component B is supported on the oxide catalyst component A.

BEST MODE FOR CARRYING OUT THE INVENTION

Figure 1:
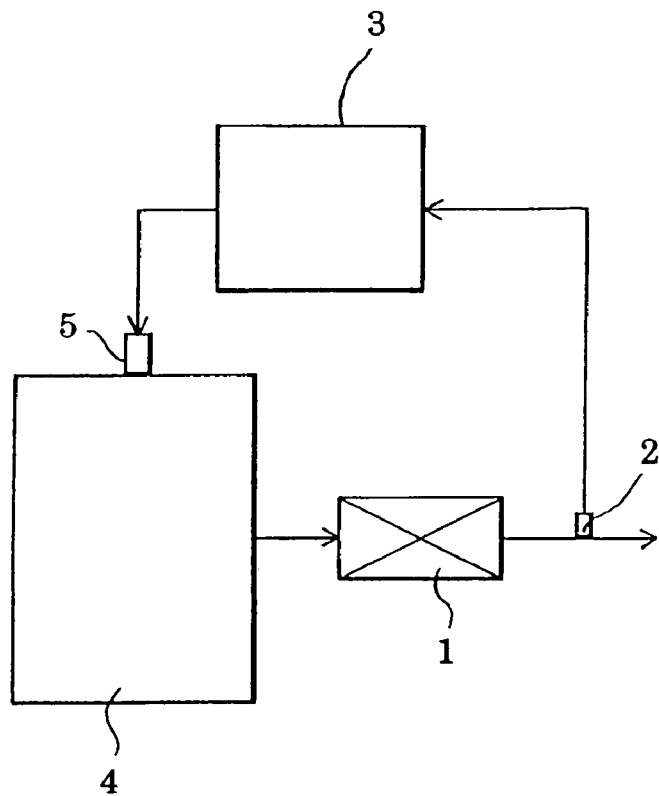
FIG. 1 shows an example of a device to adjust the concentration of oxygen at the exit of a catalytic reactor.

Herein the invention, by the catalytic reduction of nitrogen oxides is meant that NOx adsorbed on a catalyst under lean conditions where air fuel ratio is high is converted to nitrogen by a catalytic reaction in a catalytic reactor under an oxygen concentration adjusted in the range of 0.1-1.0%, preferably in the range of 0.3-0.6%, at the exit of the catalytic reactor under the rich conditions.

The method of the invention comprises subjecting fuel to combustion while the combustion atmosphere of fuel is oscillated periodically and alternately between lean conditions where air fuel ratio is high and rich conditions, leading the exhaust gas formed to a catalytic reactor, and bringing the exhaust gas into contact with a catalyst in the catalytic reactor to conduct catalytic reduction of nitrogen oxides contained in the exhaust gas, wherein the catalyst comprises as catalyst components:

(A) an oxide catalyst component A comprising
  (a) ceria or
  (b) praseodymium oxide or
  (c) a mixture of oxides and/or a composite oxide of at least two elements selected from the group consisting of cerium, zirconium, praseodymium, neodymium, terbium, samarium, gadolinium and lanthanum; and
(B) (d) a noble metal catalyst component B selected from the group consisting of platinum, rhodium, palladium and oxides thereof;

under the conditions of an oxygen concentration adjusted in the range of 0.1-1.0% at the exit of the catalytic reactor under the rich conditions.

The catalyst component A is, depending on a case, often referred to as an oxygen storage material as it has function of oxygen storing capacity.

According to the invention, the catalyst used comprises the catalyst components A and B in total at least in an amount of 50% by weight, preferably at least in an amount of 75% by weight, based on the catalyst. When the amount of the catalyst components A and B in total is less than 50% by weight, the resulting catalyst has reduced NO adsorption ability under lean conditions as well as reduced NOx conversion ability under lean conditions.

Further according to the invention, it is preferred that the catalyst components are composed of 95-99.5% by weight of catalyst component A and 0.5-5% by weight of noble metal catalyst component B. When the amount of the noble metal catalyst component B is less than 0.5% by weight in the catalyst components, the resulting catalyst has a reduced NOx adsorption ability under lean conditions where the air fuel ratio is high, and consequently, the catalyst fails to achieve high NOx conversion rate. In addition, the resulting catalyst has also reduced NOx reduction ability under rich conditions. As results, NOx conversion rate falls throughout the lean and rich excursions. However, if the amount of the noble metal catalyst component B is more than 5% by weight, the resulting catalyst is neither improved in NOx adsorption ability under lean conditions, nor in reduction ability under rich conditions of NOx adsorbed on the catalyst, and hence the incorporation of noble metal catalyst component in excess is not desirable from the standpoint of cost performance.

It is preferred that the catalyst is supported on an inactive substrate to form a catalyst structure which is exposed so as to come into direct contact with exhaust gas. If necessary, the catalyst components may be supported on a known carrier such as alumina.

According to the invention, as the oxide catalyst component A is mentioned as the component (c) as one of the embodiments, it may be a mixture of oxides of at least two of the elements and/or a composite oxide (solid solution) of at least two of the elements, that is, it may be at least one selected from the group consisting of a mixture of oxides of at least two of the elements and a composite oxide (solid solution) of at least two of the elements, and it is preferred that the mixture is a uniform mixture. However, a composite oxide of at least two of the elements is more preferred than a mixture of oxides of at least two of the elements. In particular, a binary or ternary composite oxide is preferred.

In the case of a binary composite oxide, for example, ceria/praseodymium oxide composite oxide, ceria/zirconia composite oxide, ceria/terbium oxide composite oxide or ceria/samarium oxide composite oxide, the weight ratio in terms of oxides of the elements in the composite oxide is preferably in the range of 80/20 to 60/40. In turn, in the case of a ternary composite oxide, for example, ceria/gadolinium oxide/zirconia composite oxide, ceria/neodymium oxide/zirconia composite oxide, ceria/zirconia/praseodymium oxide composite oxide, ceria/zirconia/lanthanum oxide composite oxide, ceria/zirconia/samarium oxide composite oxide, or ceria/zirconia/terbium oxide composite oxide, the weight ratio in terms of oxides of the elements in the composite oxide is preferably in the range of 45/30/30 to 75/20/5. The weight ratio in terms of oxides in the composite oxides is calculated provided that ceria, zirconia, terbium oxides, praseodymium oxide, gadolinium oxides, neodymium oxide, samarium oxides and lanthanum oxides are represented by $CeO_2$, $ZrO_2$, $TbO_2$, $Pr_6O_{11}$, $Ga_2O_3$, $Nd_2O_3$, $Sm_2O_3$ and $La_2O_3$, respectively.

The oxide catalyst component A in the catalyst of the invention can be prepared by a following method, for example. At first, a water soluble salt of an element constituting the catalyst component A, such as a nitrate, is neutralized or heated and hydrolyzed, to form a hydroxide, and the hydroxide is calcined at a temperature of 300-900° C. in an oxidative or a reductive atmosphere. However, the catalyst component A may be obtained by calcining a hydroxide or an oxide of the element available in the market.

The noble metal catalyst component B in the catalyst of the invention is obtained as powder comprised of the noble metal catalyst component B supported on the oxide catalyst component A preferably by supporting a water soluble salt of the catalyst component B on the oxide catalyst component A by an ion exchange method and then calcining the resulting product at a temperature of 500-900° C. in an oxidative or a reductive atmosphere. If necessary, the noble metal catalyst component B may be supported on a carrier such as alumina, however, it is preferred that the noble metal catalyst component B is supported on the oxide catalyst component A as mentioned above.

When the noble metal catalyst component B is supported on the oxide catalyst component A in this way, the adsorption of NOx onto the oxide catalyst component A that functions as oxygen storing material is promoted in wide temperature range, and as a result, NOx purification rate is improved over wide temperature range. In addition, the heat resistance of the catalyst is also improved because thermal degradation of the catalyst component A is suppressed on account of NOx adsorption thereonto.

According to the invention, NOx is adsorbed only on the surface of the oxide catalyst component A, unlike the case of the previously described NOx storage reduction catalyst in which NOx is adsorbed as $NO_3^-$ (nitrate ion) on an alkaline metal or an alkaline earth metal. As a result of measurement using FTIR, it was found that NOx is adsorbed on the oxide catalyst component A either in the form of oxygen bonding type (nitrate) in which at least a part of oxygen atoms of NOx bonds to metal components of the catalyst or nitrogen bonding type (nitrite) in which nitrogen atom of NOx bonds to metal components of the catalyst. However, there are a variety of types of oxygen bonding type (nitrate) and nitrogen bonding type (nitrite). Consequently, NOx adsorbed on the oxide catalyst component can be reduced under such rich conditions that an oxygen concentration is in the range of 0.1-1.0% at the exit of the catalytic reactor where NOx reduction falls, with the NOx concentration at the exit of the catalytic reactor not exceeding the NOx concentration at the inlet of the catalytic reactor. Namely, NOx can be reduced without NOx release under rich conditions, as mentioned hereinbefore.

However, when the oxygen concentration is less than 0.1% at the exit of catalytic reactor under rich conditions, a part of NOx adsorbed on the oxide catalyst component A desorbed from the adsorption sites without reacting with a reducing agent, that is to say, NOx release occurs, so that there arises a problem that NOx purification rate falls. On the other hand, when the oxygen concentration is more than 1.0% at the exit of catalytic reactor under the conditions where the air fuel ratio is low, the reduction conditions become insufficient under rich conditions, and the reaction of NOx adsorbed under lean conditions with a reducing agent does not proceed smoothly, and hence NOx purification rate falls.

According to the invention, the oxygen concentration is adjusted to be in the range of 0.1-1.0%, preferably in the range of 0.3-0.6% at the exit of catalytic reactor under rich conditions so that a higher NOx purification rate is achieved possibly because NOx adsorbed on the catalyst component A is not desorbed but is reduced efficiently with a reducing agent present in an appropriate amount under lean conditions.

The catalyst components used in the invention are obtained in various shapes such as powder or particles. Accordingly, the catalyst components can be molded to any shape such as honeycomb, annular or spherical shapes by any of hitherto well known methods. If desired, any additives, such as molding additives, reinforcements, inorganic fibers or organic binders may be used when a catalyst structure is prepared.

The catalyst of the invention may advantageously be used as a catalyst structure that is composed of an inactive substrate of any desired shape having a catalyst layer thereon prepared by a wash-coating method, for example, by coating the catalyst components on the surface of the substrate. The inactive substrate may be composed of, for example, a clay mineral such as cordierite or a metal such as stainless steel, preferably of heat-resistant, such as a Fe—Cr—Al steel, and may be in the form of honeycomb, annular or spherical structures.

The catalyst used in the invention is excellent in resistance to sulfur oxides as well as resistance to heat. Therefore, it is suitable for use as, for example, a catalyst for reduction of nitrogen oxides or for denitrization of exhaust gas from diesel engines or exhaust gas from lean burn gasoline engines of automobile.

The catalyst is used in a catalytic reaction in which the combustion atmosphere of fuel is oscillated between rich conditions and lean conditions alternately as mentioned hereinbefore. The period of the catalytic reaction (i.e., the interval between a rich atmosphere (or a lean atmosphere) and the subsequent rich atmosphere (or the lean atmosphere) is preferably 5-150 seconds and more preferably 30-90 seconds. The rich/lean span, that is, the time under the rich conditions (seconds)/the time under the lean conditions (seconds) is usually between 0.5/5 and 10/150, more preferably between 2/30 and 5/90.

The rich conditions are prepared usually by periodically injecting fuel into a combustion chamber of an engine at an air fuel ratio of 13-14 when gasoline is used as fuel, depending on oxidation power of catalyst used and kind of reducing agent formed under rich conditions and the amount thereof. According to the invention, it is necessary that exhaust gas has an oxygen concentration in the range of 0.1-1.0%, preferably in the range of 0.3-0.6%, after it has passed the catalyst reactor. The typical exhaust gas under the rich conditions contain several hundred volume ppm of NOx, 5-6% by volume of water, not more than 1% by volume of CO, not more than 1% by volume of hydrogen, several thousands volume ppm of hydrocarbons and 1-2% by volume of oxygen.

In turn, the lean conditions under which an air fuel ratio is high are prepared usually by periodically injecting fuel into a combustion chamber of an engine at an air fuel ratio of 20-40 when gasoline is used as fuel. The typical exhaust gas under the lean conditions contains several hundred volume ppm of NOx, 5-6% by volume of water, several thousands volume ppm of CO, several thousands volume ppm of hydrogen, several thousand volume ppm of hydrocarbons and 5-10% by volume of oxygen.

In working the method of the invention, the oxygen concentration at the exit of the catalytic reactor under rich conditions is adjusted to be in the range of 0.1-1.0% by, for example, measuring the oxygen concentration at the exit of the catalytic reactor with an oxygen concentration meter provided at the exit of the catalytic reactor and controlling the amount of fuel injected into a combustion chamber to adjust an air fuel ratio so that the oxygen concentration at the exit of the catalytic reactor has the target value.

The above-mentioned method measures the oxygen concentration at the exit of the catalytic reactor, and the oxygen concentration is fed back and air fuel ratio is directly adjusted so that the oxygen concentration at the exit of the catalytic reactor has a predetermined target value. However, the oxygen concentration at the exit of the catalytic reactor under rich conditions can be adjusted by another method. By way of example, the oxygen concentration at the exit of the catalytic reactor is measured by experiments and the relationship between this oxygen concentration and air fuel ratio of the exhaust gas at the exit of the catalytic reactor is in advance determined, and the relationship is incorporated into an engine control unit (ECU) as engine control data. Then, as shown in FIG. 1, the oxygen concentration of the exhaust gas at the exit of the catalytic reactor is measured with an air fuel ratio sensor 2 provided at the exit of catalytic reactor 1, and the thus measured oxygen concentration is fed to an engine control unit 3. The engine control unit then instructs a fuel injecting device 5 to inject fuel into an engine 4 in such an amount that the oxygen concentration has a predetermined target value at the exit of the catalytic reactor based on the engine control data.

The temperature at which the catalytic reduction of NOx is carried out is usually in the range of 150-450° C., preferably in the range of 200-400° C., so that the catalyst used has an effective catalyst activity for the reduction of NOx over a long period of time throughout the rich/lean excursions, although it depends on the individual composition of exhaust gas to be reacted. Within the above range of reaction temperature, exhaust gas is treated preferably at a space velocity of 5,000-150,000 $h^{-1}$.

According to the method of the invention, as mentioned hereinbefore, fuel is subjected to combustion mainly under lean conditions, while the combustion atmosphere of the fuel is oscillated between rich conditions and lean conditions alternately, and the generated exhaust gas containing NOx is brought into contact with a catalyst in a catalytic reactor under the conditions of an oxygen concentration adjusted to be in the range of 0.1-1%, preferably in the range of 0.3-0.6%, at the exit of the catalytic reactor under rich conditions, thereby NOx in the exhaust gas can be catalytically reduced efficiently even in the presence of oxygen, sulfur oxides or water.

INDUSTRIAL APPLICABILITY OF THE INVENTION

The method of the invention makes it possible to reduce catalytically NOx contained in exhaust gas in wide range of temperature even in the presence of oxygen, sulfur oxides or water without deterioration of catalyst, i.e., with high durability of catalyst, and high fuel efficiency. In particular, NOx can be catalytically removed in wide range of temperature even in the presence of oxygen, sulfur oxides or water, especially even in the presence of sulfur oxides which brings about serious problem to the NOx storage catalyst, without a large loss of fuel under rich conditions, i.e., at a small fall of fuel efficiency, as well as generation of harmful ammonia under rich conditions, and further without so-called NOx release, that is to say, the NOx concentration at the exit of the catalytic reactor being larger than the NOx concentration at the inlet of the catalytic reactor. The method of the invention is not accompanied by a large loss of fuel under rich condi-

EXAMPLES

The invention is now illustrated in greater detail with reference to examples of preparation of powder catalysts for use as the catalyst components and examples of preparation of honeycomb catalyst structures using the above-mentioned powder catalyst, as well as examples of catalytic activity for reduction of nitrogen oxides of the thus prepared catalyst structures; however, it should be understood that the invention is not limited thereto. All the parts and percentages are hereinafter on the basis of weight unless otherwise specified.

(1) Preparation of Oxide Catalyst Component A

Preparation Example 1

151.37 g of cerium nitrate ($Ce(NO_3)_3 \cdot 6H_2O$) was dissolved in 1000 ml of ion-exchanged water to prepare an aqueous solution. 0.1-N ammonia water was added to the aqueous solution to neutralize and hydrolyze the cerium ions, and the resulting slurry was aged for one hour. The resulting product was separated from the slurry by filtering, dried at a temperature of 120° C. for 24 hours, and then calcined in the air at a temperature of 500° C. for three hours to obtain ceria powder (having a specific surface area of 138 m²/g).

Preparation Example 2

77.83 g of cerium nitrate ($Ce(NO_3)_3 \cdot 6H_2O$), 36.03 g of zirconium oxynitrate ($ZrO(NO_3)_2$) and 35.26 g of praseodymium nitrate ($Pr(NO_3)_3 \cdot 6H_2O$) were dissolved in 1000 ml of ion-exchanged water to prepare an aqueous solution. 0.1-N ammonia water was added to the aqueous solution to neutralize and hydrolyze the cerium salt, oxyzirconium salt and praseodymium salt, and the resulting slurry was aged for one hour. The resulting product was separated from the slurry by filtering, dried at a temperature of 120° C. for 24 hours, and then calcined in the air at a temperature of 500° C. for three hours to obtain ceria/zirconia/praseodymium oxide composite oxide powder (having an oxide weight ratio of 47/33/22 and a specific surface area of 205 m²/g).

Preparation Example 3

34.59 g of cerium nitrate ($Ce(NO_3)_3 \cdot 6H_2O$), 84.45 g of zirconium oxynitrate ($ZrO(NO_3)_2$) and 7.97 g of lanthanum nitrate ($La(NO_3)_3 \cdot 6H_2O$) were dissolved in 1000 ml of ion-exchanged water to prepare an aqueous solution. 0.1-N ammonia water was added to the aqueous solution to neutralize and hydrolyze the cerium salt, oxyzirconium salt and lanthanum salt, and the resulting slurry was aged at a temperature of 80° C. for one hour. The resulting product was separated from the slurry by filtering, dried at a temperature of 120° C. for 24 hours, and then calcined in the air at a temperature of 500° C. for three hours to obtain ceria/zirconia/lanthanum oxide composite oxide powder (having an oxide weight ratio of 22/73/5 and a specific surface area of 80 m²/g).

Preparation Example 4

121.06 g of cerium nitrate ($Ce(NO_3)_3 \cdot 6H_2O$), 28.12 g of zirconium oxynitrate ($ZrO(NO_3)_2$) and 7.48 g of gadolinium nitrate ($Gd(NO_3)_3 \cdot 6H_2O$) were dissolved in 1000 ml of ion-exchanged water to prepare an aqueous solution. 0.1-N ammonia water was added to the aqueous solution to neutralize and hydrolyze the cerium salt, oxyzirconium salt and gadolinium salt, and the resulting slurry was aged for one hour. The resulting product was separated from the slurry by filtering, dried at a temperature of 120° C. for 24 hours, and then calcined in the air at a temperature of 500° C. for three hours to obtain ceria/zirconia/gadolinium oxide composite oxide powder (having an oxide weight ratio of 72/24/4 and a specific surface area of 198 m²/g).

Preparation Example 5

109.43 g of cerium nitrate ($Ce(NO_3)_3 \cdot 6H_2O$), 31.27 g of zirconium oxynitrate ($ZrO(NO_3)_2$) and 15.63 g of neodymium nitrate ($Nd(NO_3)_3 \cdot 6H_2O$) were dissolved in 1000 ml of ion-exchanged water to prepare an aqueous solution. 0.1-N ammonia water was added to the aqueous solution to neutralize and hydrolyze the cerium salt, oxyzirconium salt and neodymium salt, and the resulting slurry was aged for one hour. The resulting product was separated from the slurry by filtering, dried at a temperature of 120° C. for 24 hours, and then calcined in the air at a temperature of 500° C. for three hours to obtain ceria/zirconia/neodymium oxide composite oxide powder (having an oxide weight ratio of 70/20/10 and a specific surface area of 171 m²/g).

(2) Preparation of Oxide Catalyst Component A Supporting Noble Metal Catalyst Component B Thereon Preparation Example 6

16.80 g of ($Pt(NH_3)_4(NO_3)_2$ aqueous solution (9.0% as platinum) was added to 100 ml of ion-exchanged water to prepare an aqueous solution. 60 g of ceria powder prepared in Preparation Example 1 was added to the aqueous solution, followed by drying at 100° C. with agitation and calcining at 500° C. for three hours in the air to provide a powder catalyst composed of ceria supporting 2% of platinum thereon.

Preparation Example 7

16.80 g of $Pt(NH_3)_4(NO_3)_2$ aqueous solution (9.0% as platinum) and 4.20 g of rhodium nitrate aqueous solution (9.0% as rhodium) were added to 100 ml of ion-exchanged water to prepare an aqueous solution. 60 g of ceria/zirconia/praseodymium oxide composite oxide powder prepared in Preparation Example 2 was added to the aqueous solution, followed by drying at 100° C. with agitation and calcining at 500° C. for three hours in the air to provide a powder catalyst composed of ceria/zirconia/praseodymium oxide composite oxide powder supporting 2% of platinum and 0.5% of rhodium thereon.

Preparation Example 8

16.80 g of $Pt(NH_3)_4(NO_3)_2$ aqueous solution (9.0% as platinum) and 4.20 g of palladium nitrate aqueous solution (9.0% as palladium) were added to 100 ml of ion-exchanged water to prepare an aqueous solution. 60 g of ceria/zirconia/lanthanum oxide composite oxide powder prepared in Preparation Example 3 was added to the aqueous solution, followed by drying at 100° C. with agitation and calcining at 500° C. for three hours in the air to provide a powder catalyst composed of ceria/zirconia/lanthanum oxide composite oxide powder supporting 2% of platinum and 0.5% of palladium thereon.

(3) Preparation of Honeycomb Catalyst Structure

The thickness of catalyst layer was calculated provided that the apparent density of the layer is 1.0 g/cm³ and the geometric specific surface area of the honeycomb is 2500 m²/g.

Example 1

60 g of the ceria powder catalyst supporting 2% of platinum thereon (prepared in Preparation Example 6) was mixed with 6 g of silica sol (Snowtex N available from Nissan Kagaku Kogyo K.K. and having a concentration of 20% by weight in terms of silica, the same hereunder) and an appropriate amount of water. The resulting mixture was ground with a planetary mill for five minutes by using 50 g of zirconia balls as grinding media to obtain a wash coating slurry. A honeycomb substrate made of cordierite having a cell number of 400 per square inch was coated with the wash coating slurry to obtain a honeycomb structure having a catalyst layer 30 μm thick containing the above-mentioned catalyst on the substrate.

Example 2

A honeycomb catalyst structure having a catalyst layer 60 μm thick was obtained in the same manner as Example 1 by using the ceria/zirconia/praseodymium oxide composite oxide powder catalyst supporting 2% of platinum and 0.5% of rhodium (prepared in Preparation Example 7).

Example 3

A honeycomb catalyst structure having a catalyst layer 60 μm thick was obtained in the same manner as Example 1 by using the ceria/zirconia/lanthanum oxide composite oxide powder catalyst supporting 2% of platinum and 0.5% of rhodium (prepared in Preparation Example 8).

Example 4

A honeycomb catalyst structure having a catalyst layer 60 μm thick was obtained in the same manner as Example 1 by using 50 g of powder catalyst composed of ceria supporting 2% of platinum thereon (prepared in Preparation Example 6) and 10 g of ceria/zirconia/neodymium oxide composite oxide powder (prepared in Preparation Example 5).

Example 5

A honeycomb catalyst structure having a catalyst layer 60 μm thick was obtained in the same manner as Example 1 by using 50 g of powder catalyst composed of ceria supporting 2% of platinum thereon (prepared in Preparation Example 6) and 10 g of ceria/zirconia/gadolinium oxide composite oxide powder (prepared in Preparation Example 4).

(4) Performance Test

Figure 2:
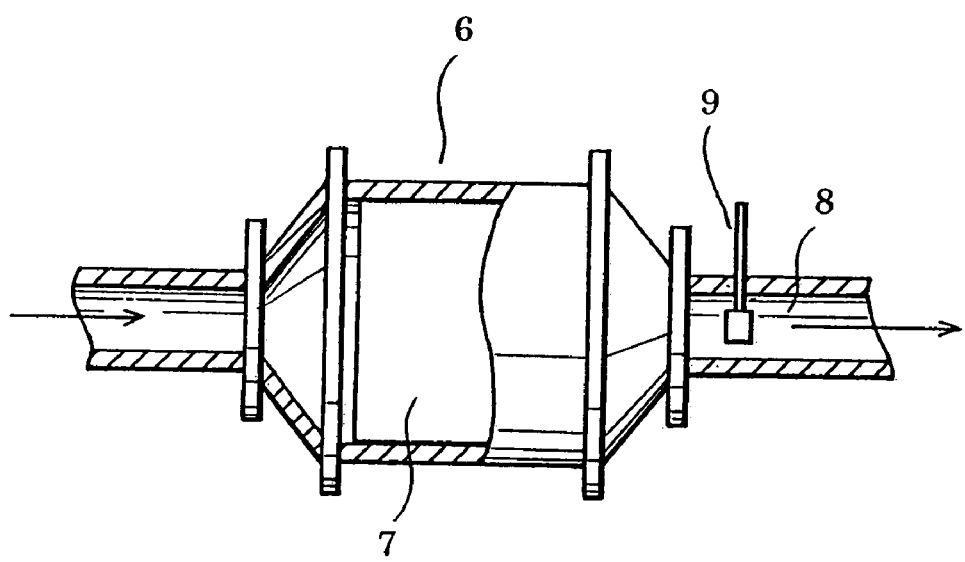
FIG. 2 shows an experimental device used for purification of gas containing nitrogen oxides in examples of the invention.

As shown in FIG. 2, a honeycomb catalyst structure 7 prepared in each of Examples was charged in a catalytic reactor 6. The oxygen concentration at the exit 8 of the catalytic reactor was changed by adjusting the carbon monoxide concentration contained in a gas mixture supplied to the catalytic reactor under rich conditions. While the oxygen concentration of the gas mixture at the exit 8 of the catalytic reactor was measured by using an oxygen concentration meter 9 placed at the exit of the catalytic reactor, the gas mixture was supplied to the catalytic reactor whilst the combustion atmosphere of fuel was oscillated periodically and alternately between rich and lean conditions with the span of the rich/lean conditions of 5/55 (s/s), thereby conducting catalytic reduction of nitrogen oxides. The reaction conditions employed were as follows. The conversion (removal rate) from nitrogen oxides to nitrogen was measured by a chemical luminescence method. The results are shown in Tables 1 and 2.

Testing Method

The composition of the gas mixture used in the reduction experiment of NOx under the rich conditions was as follows:
NO: 100 ppm
$SO_2$: 50 ppm
$O_2$: 1%
CO: 0.5%, 0.75%, 0.1%, 1.15%, 1.75% or 2% (varied)
$C_3H_6$ (propylene): 2000 ppm
$H_2$: 1%
$H_2O$: 9.0%

The composition of the gas used under the lean conditions was as follows:
NO: 100 ppm
$SO_2$: 50 ppm
$O_2$: 9.0%
CO: 0.2%
$C_3H_6$ (propylene): 500 ppm
$H_2$: 0%
$H_2O$: 6.0%

(i) Space Velocity:
100000 $h^{-1}$ (under the lean conditions)
100000 $h^{-1}$ (under the rich conditions)

(ii) Reaction Temperature:
200, 250, 300, 350 or 400° C.

As apparent from the results shown in Tables 1 and 2, the catalysts of the invention have high conversion rate for nitrogen oxides, whereas the catalysts of Comparative Examples have on the whole a low conversion rate for nitrogen oxides.

TABLE 1

| | | Temperature at the exit of the catalytic reactor (° C.) | | | | |
|---|---|---|---|---|---|---|
| | | 200 | 250 | 300 | 350 | 400 |
| Example 1 | Oxygen Concentration at the exit of the catalytic reactor (%) | 0.60 | 0.56 | 0.47 | 0.38 | 0.32 |
| | NOx Conversion Rate (%) | 91.8 | 93.8 | 94.2 | 93.6 | 88.1 |
| | Oxygen Concentration at the exit of the catalytic reactor (%) | 0.54 | 0.36 | 0.28 | 0.22 | 0.19 |
| | NOx Conversion Rate (%) | 93.9 | 94.6 | 94.1 | 92.0 | 83.7 |
| | Oxygen Concentration at the exit of the catalytic reactor (%) | 0.18 | 0.16 | 0.14 | 0.13 | 0.12 |
| | NOx Conversion Rate (%) | 85.2 | 91.4 | 92.5 | 90.1 | 84.9 |
| | Oxygen Concentration at the exit of the catalytic reactor (%) | 0.36 | 0.34 | 0.32 | 0.31 | 0.30 |
| | NOx Conversion Rate (%) | 91.5 | 93.2 | 93.8 | 93.1 | 87.5 |
| | Oxygen Concentration at the exit of the catalytic reactor (%) | 0.79 | 0.85 | 0.88 | 0.91 | 0.95 |
| | NOx Conversion Rate (%) | 86.8 | 92.1 | 89.5 | 87.3 | 80.8 |

TABLE 1-continued

|  |  | Temperature at the exit of the catalytic reactor (° C.) | | | | |
|---|---|---|---|---|---|---|
|  |  | 200 | 250 | 300 | 350 | 400 |
| Comparative Example | Oxygen Concentration at the exit of the catalytic reactor (%) | 2.76 | 2.15 | 1.83 | 1.56 | 1.37 |
|  | NOx Conversion Rate (%) | 74.0 | 78.3 | 79.7 | 68.1 | 57.2 |

TABLE 2

|  |  | Temperature at the exit of the catalytic reactor (° C.) | | | | |
|---|---|---|---|---|---|---|
|  |  | 200 | 250 | 300 | 350 | 400 |
| Comparative Example | Oxygen Concentration at the exit of the catalytic reactor (%) | 0.09 | 0.08 | 0.07 | 0.05 | 0.00 |
|  | NOx Conversion Rate (%) | 81.7 | 89.4 | 88.5 | 85.6 | 81.0 |
| Example 2 | Oxygen Concentration at the exit of the catalytic reactor (%) | 0.55 | 0.49 | 0.39 | 0.33 | 0.30 |
|  | NOx Conversion Rate (%) | 88.8 | 92.0 | 93.3 | 92.4 | 85.7 |
| Example 3 | Oxygen Concentration at the exit of the catalytic reactor (%) | 0.58 | 0.51 | 0.45 | 0.36 | 0.34 |
|  | NOx Conversion Rate (%) | 87.5 | 91.7 | 91.0 | 90.2 | 83.1 |
| Example 4 | Oxygen Concentration at the exit of the catalytic reactor (%) | 0.56 | 0.51 | 0.45 | 0.39 | 0.35 |
|  | NOx Conversion Rate (%) | 82.8 | 92.7 | 95.9 | 95.6 | 94.2 |
| Example 5 | Oxygen Concentration at the exit of the catalytic reactor (%) | 0.58 | 0.52 | 0.47 | 0.43 | 0.39 |
|  | NOx Conversion Rate (%) | 90.2 | 93.6 | 93.9 | 92.4 | 87.5 |
| Example 6 | Oxygen Concentration at the exit of the catalytic reactor (%) | 0.53 | 0.58 | 0.39 | 0.35 | 0.31 |
|  | NOx Conversion Rate (%) | 93.4 | 95.5 | 95.6 | 95.0 | 92.2 |

The invention claimed is:

1. A method which comprises subjecting fuel to combustion while the combustion atmosphere of fuel is oscillated periodically and alternately between rich and lean conditions, leading the exhaust gas formed to a catalytic reactor, and bringing the exhaust gas into contact with a catalyst in the catalytic reactor to conduct catalytic reduction of nitrogen oxides contained in the exhaust gas, wherein the catalyst comprises as catalyst components:
   (A) an oxide catalyst component A comprising
      (a) ceria or
      (b) praseodymium oxide or
      (c) a mixture of oxides and/or a composite oxide of at least two elements selected from the group consisting of cerium, zirconium, praseodymium, neodymium, terbium, samarium, gadolinium and lanthanum; and
   (B) (d) a noble metal catalyst component B comprising at least one of platinum and oxide thereof, or at least one of platinum and oxide thereof and at least one of rhodium, palladium and oxides thereof, and supported by the oxide catalyst component A;
   under an oxygen concentration adjusted in the range of 0.1-1.0% at the exit of the catalytic reactor under the rich conditions.

2. The method as claimed in claim 1 in which the catalyst comprises the oxide catalyst component A and the noble metal catalyst component B in total at least in an amount of 50% by weight.

3. The method as claimed in claim 1 in which the catalyst components are composed of 95-99.5% by weight of the oxide catalyst component A and 0.5-5% by weight of the noble metal catalyst component B.

4. The method as claim 1 in which the oxygen concentration at the exit of the catalytic reactor under the rich conditions is adjusted to be in the range of 0.3-0.6%.

5. The method according to claim 1 wherein the period of the catalytic reaction is from 5 to 150 seconds.

6. The method according to claim 5 wherein the period is 30 to 90 seconds.

7. The method according to claim 1 wherein the rich/lean span is between 0.5/5 and 10/150.

8. The method according to claim 7 wherein the rich/lean span is between 2/30 and 5/90.

* * * * *